US006497754B2

(12) United States Patent
Joannou

(10) Patent No.: US 6,497,754 B2
(45) Date of Patent: Dec. 24, 2002

(54) SELF IONIZING PLEATED AIR FILTER SYSTEM

(76) Inventor: Constantinos J. Joannou, 93 Hobart Crescent, Nepean, Ontario (CA), K2H 5S3

( * ) Notice: Subject to any disclaimer, the term of this patent is extended or adjusted under 35 U.S.C. 154(b) by 0 days.

(21) Appl. No.: 09/824,539

(22) Filed: Apr. 4, 2001

(65) Prior Publication Data

US 2002/0170435 A1 Nov. 21, 2002

(51) Int. Cl.[7] .......................... B03C 3/41; B29C 53/04

(52) U.S. Cl. .............................. 96/67; 55/521; 55/524; 55/DIG. 5; 95/59; 96/69; 96/96; 264/129; 264/286; 264/287; 264/DIG. 48

(58) Field of Search ............................... 96/67, 69, 96; 95/59; 55/521, 524, DIG. 5; 264/286, 129, 287, 131, DIG. 48

(56) References Cited

U.S. PATENT DOCUMENTS 2,588,111 A * 3/1952 Hanneman .................... 96/67
2,729,302 A * 1/1956 True .............................. 96/67
3,181,284 A * 5/1965 Copenhefer .................... 96/67
4,715,870 A * 12/1987 Masuda et al. ................ 96/67
4,750,921 A * 6/1988 Sugita et al. .................. 96/67
4,781,736 A * 11/1988 Cheney et al. .............. 96/67 X
4,978,372 A * 12/1990 Pick .............................. 96/67
5,403,383 A * 4/1995 Jaisinghani ............... 96/67 X
5,466,279 A * 11/1995 Hattori et al. ................ 96/69
5,518,531 A * 5/1996 Joannu .......................... 96/55
5,573,577 A * 11/1996 Joannou ........................ 96/66

* cited by examiner

*Primary Examiner*—Richard L. Chiesa
(74) *Attorney, Agent, or Firm*—David J. French

(57) ABSTRACT

A pleated filter is provided with electrically conductive fibrous material that releases ions to improve trapping efficiency. The edges of folded filter media are rendered emitting as by attaching conductive strings to the edges of the folds. The ends of the fibers in the strings are left exposed and, by applying high voltage on these strings, ions may be produced which charge dust particles to improve the filter's efficiency. Alternately, the pleated medium itself provides ion-emitting fiber ends along folded edges that have been rendered conductive.

16 Claims, 3 Drawing Sheets

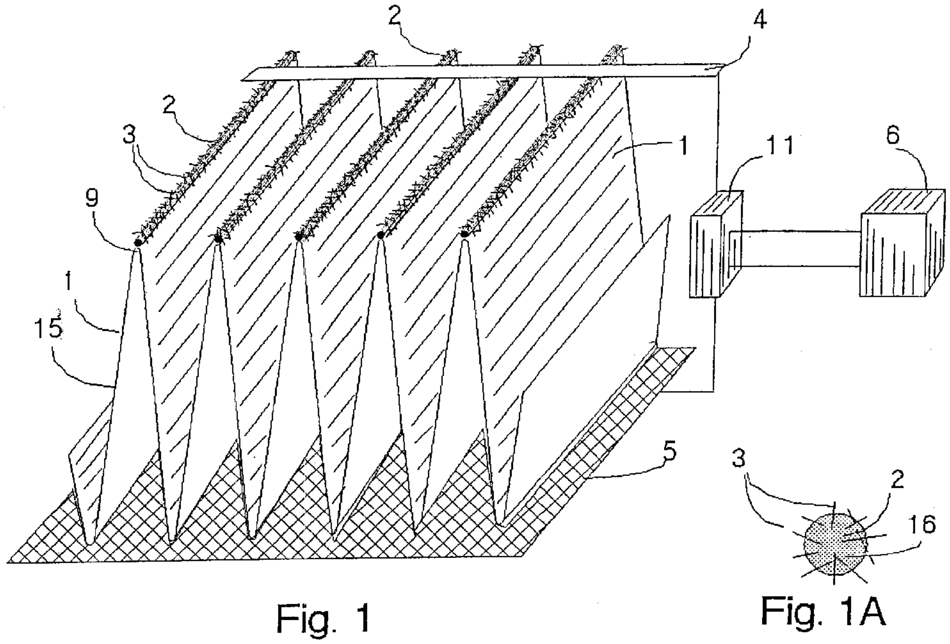
Fig. 1
Fig. 1A
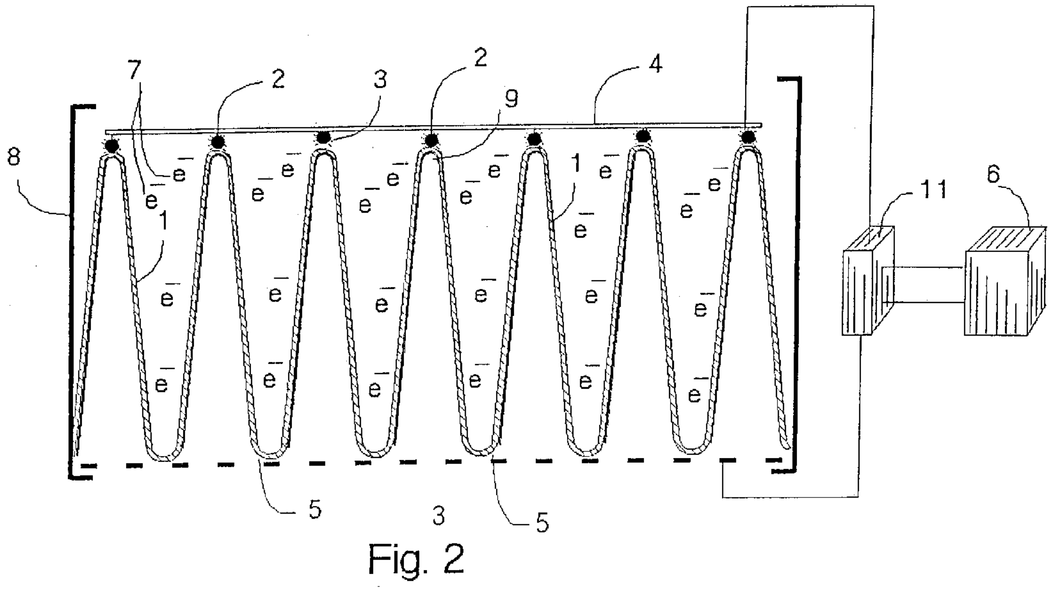
Fig. 2

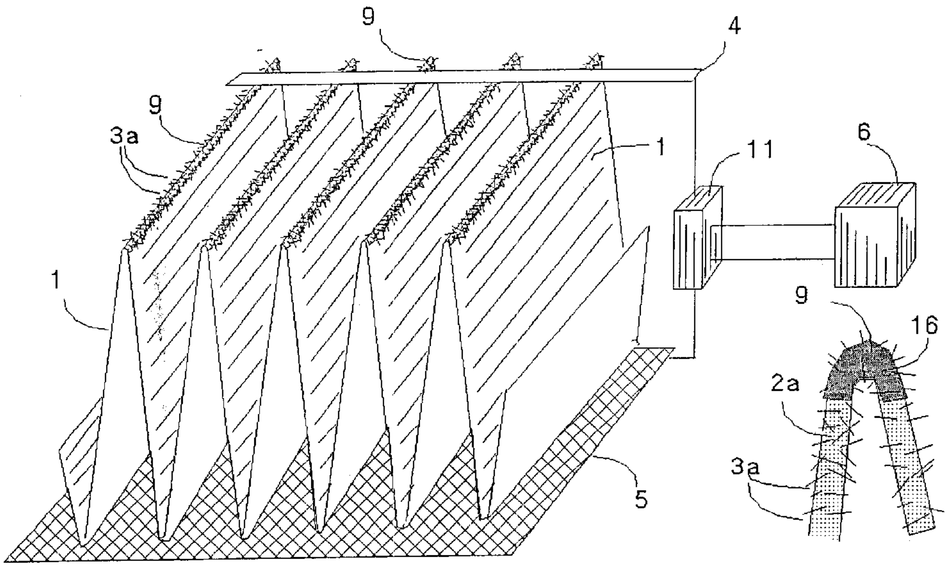
Fig. 3
Fig. 3A
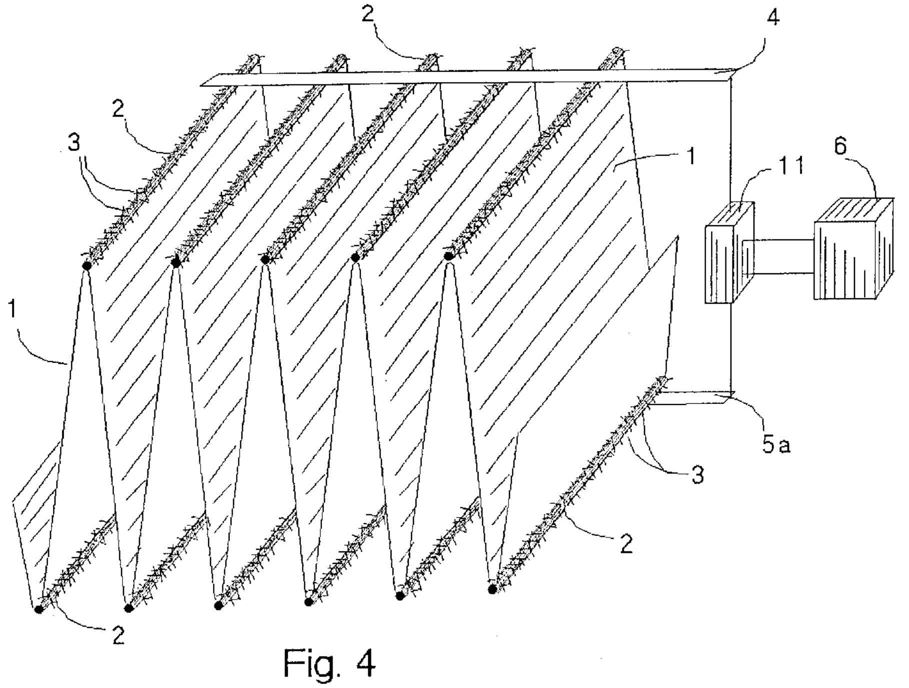
Fig. 4

SELF IONIZING PLEATED AIR FILTER SYSTEM

FIELD OF THE INVENTION

This invention relates to air filters, which are enhanced by ionization. In particular it applies to pleated filters provided with means to produce ionization to increase trapping efficiency.

BACKGROUND OF THE INVENTION

It is well known that charged particles are more readily captured by a filter medium than are neutral particles. In the prior art, one of the most common ionizing air filters is the Precipitator type. This is an electronic air filter in which ionizing wires of about 0.005 inches diameter, charged at about 7 Kilovolts, are placed between grounded plates to generate a corona and charge the dust particles passing therethrough. Further down the airflow path, alternating charged and grounded plates collect the charged particles of dust. The disadvantage of precipitator type filters is that they are difficult to maintain, requiring regular cleaning of the collector plates, which get loaded with fine dust. Cleaning often requires using very strong detergents. Another disadvantage of the precipitator type filter is that they produce a significant amount of ozone. This occurs because the charging wires are placed near grounded surfaces. This arrangement generates corona all along the length of the wires, which can be seen glowing in the dark.

In my U.S. Pat. No. 5,573,577, "Ionizing and Polarizing Electronic Air Filter", (Jun. 20, 2000) a method of producing ions in association with a trapping medium by electrifying conductive fibers is disclosed. Ions are generated at the exposed ends of string filaments which are made conductive by a carbon or graphite solution. This solution coats the strings, leaving the protruding, conductive fiber ends of the string exposed so that, upon application of high voltage, the fiber ends become sources of ions. Another aspect of my previous invention is that ions can be produced on the surface of a trapping medium by having "an ionizing grid 10 . . . formed by depositing conductive paint or colloidal graphite on a sheet of gauze 11. Gauze 11, because it is rendered conducting, functions the same way as fine wires 5 in effecting ionization" (see FIG. 5 in the above patent). The present invention is an improvement to my previous patents in combining ionizing elements with filter trapping medium.

Another U.S. patent is U.S. Pat. No. 4,715,870 (Dec. 29,1987) to Masuda, et al. This patent describes a Minipleat filter which is enhanced by attaching electrodes, in the form of conductive paint, to the folded edges of the Minipleat filter. A high voltage is then applied to these electrodes. In this patent, the applied voltage generates an electrostatic field which polarizes the media. This patent also discloses a series of ionizing wires and grounded plates much as in a precipitator located upstream from the filter in the airflow. These wires generate ions which charge particles of dust in the airflow to increase trapping efficiency in the pleated downstream pleated filter.

In the Masuda patent, there is no mention of any ionization taking place at the folded edges of the Minipleat filter. Unless the conductive paint used is such that it leaves pointed ends of the conductive fibers exposed, the use of conductive paint will not allow ionization to take place. In line 54 on page 3, the Masuda patent discloses that "a leakage current rarely occurs". If ions were being produced, then a current would be present. This suggests that the electrodes in this patent produce only polarization of the filter media and not ionization. Ionization requires current to occur between the electrodes.

An object of the present invention is therefore to provide a disposable, pleated filter that, through use of ionization, has a high efficiency. Another object of the invention is to provide a filter which has simple construction and is economical to operate.

The invention in its general form will first be described, and then its implementation in terms of specific embodiments will be detailed with reference to the drawings following hereafter. These embodiments are intended to demonstrate the principle of the invention, and the manner of its implementation. The invention in its broadest and more specific forms will then be further described, and defined, in each of the individual claims which conclude this Specification.

SUMMARY OF THE INVENTION

In a broad aspect the invention is directed to an air filtration system for placing in an air stream comprising:

1) a pleated, air permeable, filter medium of electrically insulative material having folded edges present both along an up-stream side and a down-stream side of said filter medium with respect to the direction of airflow to be passed therethrough,
2) exposed, conductive, pointed fiber ends located at least along the up-stream side of said filter medium,
3) a counter electrode in the form of ion-inducing conductive array positioned on the downstream side of the filter, and
4) a high voltage ionizing power supply connected through electrical coupling means at one side of its polarity to the conductive fiber ends, and connected at its other side to said conductive array, to thereby create an electric field between the conductive fiber ends and the conductive array that causes said conductive fiber ends to emit ions that will charge dust particles in an air stream and increase trapping efficiency.

More particularly, according to one variant, the invention employs a pleated filter comprising conductive strings having conductive fiber ends attached to the filter medium along the folded edges of the pleats of the filter. By applying high voltage to these strings, the fiber ends in the strings emit ions which charge the dust particles entering the filter, thus improving the efficiency of the filter.

According to another variation of the invention, a pleated filter of fibrous material is employed which itself provides fiber ends along the folded edges of the filter. Instead of having coated strings, the folded edges of the pleated filter medium may be coated with a conductive solution so that fiber ends within the coated, fibrous filter medium are left exposed and produce the ions when charged by the power supply. The downstream, folded edges of the pleated filter may be similarly coated to provide the ion-inducing conductive array.

By a further variant of the invention a conductive fibrous mesh having multiple pointed fiber ends contained therein is positioned along the upstream folded edges of the pleated filter medium. Electrification of the pointed fiber ends within the mesh produces ions which charge dust particles entering the pleated medium.

Because the pointed ionizing elements employed in this air filtration system, produce a very small amount of corona, the system requires only a small amount of current to operate. The test filter in question operated on a high voltage power supply that required only approximately three (3) watts of power from a 24V AC originating source to drive the power supply. Because of the low current demands placed on the high voltage power supply, it may have high internal impedance. This reduces the shock risk to users who may inadvertently touch high potential components.

The foregoing summarizes the principal features of the invention and some of its optional aspects. The invention may be further understood by the description of the preferred embodiments, in conjunction with the drawings, which now follow.

BRIEF DESCRIPTION OF DRAWINGS:

FIG. 1 is a pictorial view of the invention showing ionizing strings attached to the leading, upstream edges of the pleated filter medium mounted over a downstream conductive screen that serves as an ion-inducing conductive array.

FIG. 1A is a cross-sectional view of a conducting string of FIG. 1 showing the exposed conductive fiber ends of the string.

FIG. 2 is a cross-sectional side view of the filter of FIG. 1 in a filter assembly showing charged particles "e-" present between pleats.

FIG. 3 is similar to FIG. 1 but with the folded edges of a fibrous pleated filter rendered conducting with a conducting solution, leaving the ends of fibers protruding from within the filter medium to emit ions.

FIG. 3A is cross-sectional view of the edge of a pleat of the pleated filter of FIG. 3, showing the conductive coating and exposed fiber ends.

FIG. 4 shows a variation of the filter shown in FIG. 1 but with the down-stream edges of the pleated filter made conducting with string 2 in lieu of the grounding screen to serve as the ion-inducing array.

DETAIL DESCRIPTION OF THE INVENTION

Figure 5:
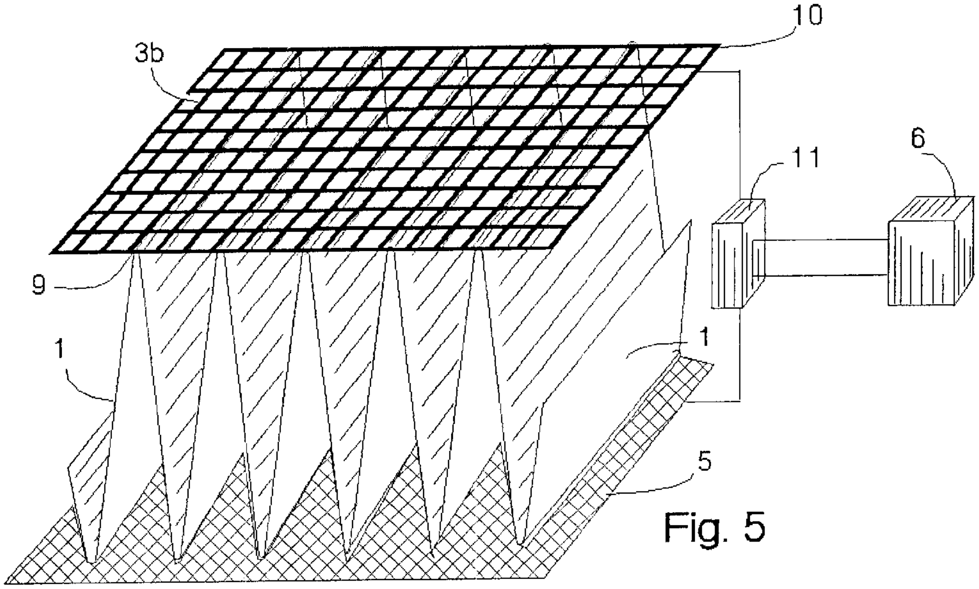
FIG. 5 shows an alternative construction where a conductive mesh screen having fiber ends is used on top of the pleated filter medium to serve as an ionizing element.

In FIG. 1, a pleated filter 1 is made of electrically non-conductive, fibrous, particle trapping material that is permeable to air. The filter material is preferably fibrous but may be, for some applications, sponge-like etc. Conductive strings 2 are attached to the folded edges 9 of the pleated filter. Protruding from the strings 2 are pointed string fiber ends 3 (exaggerated) which are also conducting. FIG. 1A is an enlarged cross-sectional view of a conductive string 2 also showing the protruding fiber ends 3.

FIG. 2 shows a cross-sectional view of an air filtration assembly employing the pleated filter 1 of FIG. 1 and oriented to receive a downward airflow. Contact electrode 4 is in contact with the conducting strings 2 along the upstream sides of the filter 1. A high voltage power supply 6 is connected between strings 2 and screen 5 through connector 11. Screen 5 acts as a counter-electrode and serves as an ion-inducing conductive array 11. Contact electrode 4, screen 5 and connector 11 together serve as a coupling means to supply electrical potential which creates an electrical field. The casing 8 of filter 1 represents the outer casing of a practical filter assembly.

Ions 7 are generated by the ends 3 of the conductive fibers 2 when high voltage is applied to such fibers 2. These ions 7 charge the dust particles that are swept by the airflow into the pleated filter 1 and trapped therein.

In FIGS. 3 and 3A, the upstream edges 9 of a fibrous pleated filter medium 1 have been made conductive by painting the folded edges 9, along with the protruding ends **3*a* of the fibers 2*a* which are within and protruding from the filter medium 1, with a conductive paint, allowing the ends 3*a* of the filter medium fibers 2*a* to remain exposed. Again, such fiber ends 3*a* are a source of ions 7. The conductive paint may be a solution of carbon or equivalent that leaves the carbon etc. as a conductive deposit 16. Alternately, other conductive materials may be used, such as finely dispersed aluminum or copper, to provide the conductive deposit 16. It is important, however, that the conductive fiber 3*a*** ends are left exposed. For this reason carbon is preferred.

FIG. 4, shows an arrangement where the screen 5 of FIG. 1 has been replaced by conductive strings 2 which act as a counter-electrode or ion-inducing conductive array. A contact electrode **5*a* lying across the strings 2 provides connection to power supply 6 via connecting means 11. As an alternative arrangement the downstream folded edges of the pleated filter of FIG. 3** may be themselves rendered conductive as described above to provide the ion-inducing conductive array.

In FIG. 5, mesh screen 10 is made of fibrous material which is conducting and has fiber ends **3*b* exposed in a similar way as with the conductive strings 2. This mesh screen 10 may be a perforated sheet of paper. A conductive net or woven or non-woven fibrous pad with exposed fiber ends could also serve as the mesh 10. This mesh screen 10 may be preinstalled in the filter casing 8, or may be attached to the pleated filter assembly for installation in a cartridge format. Screen 10 is connected to high voltage power supply 6 to create the electric field. In this case, again, ions 7 are emitted along the upstream edges 9 of the pleated filter 1 in a similar manner as in the arrangements of FIGS. 1 to 4**.

High voltage is applied between contact electrodes 4 and screen 5 (or its equivalent) from the high voltage (6–20 KV) supply 6 and is thus carried to the conducting strings 2 and the fiber ends 3. Because of the intense, high voltage gradient that forms at the fiber ends 3, fiber ends 3 emit ions 7. These, in turn, charge the dust particles passing through filter 1 and thus the filter's efficiency is enhanced. The same operating principle applies to the FIG. 3 version of the filter where the folded edges 9 of the filter medium are made conducting, thus generating ions 7 under the intense high voltage gradient that surrounds pointed conductors **3*a*. This principle further applies in the case where conductive mesh screen 10 with exposed fiber ends 3*b* are used (FIG. 5**).

Figure 6:
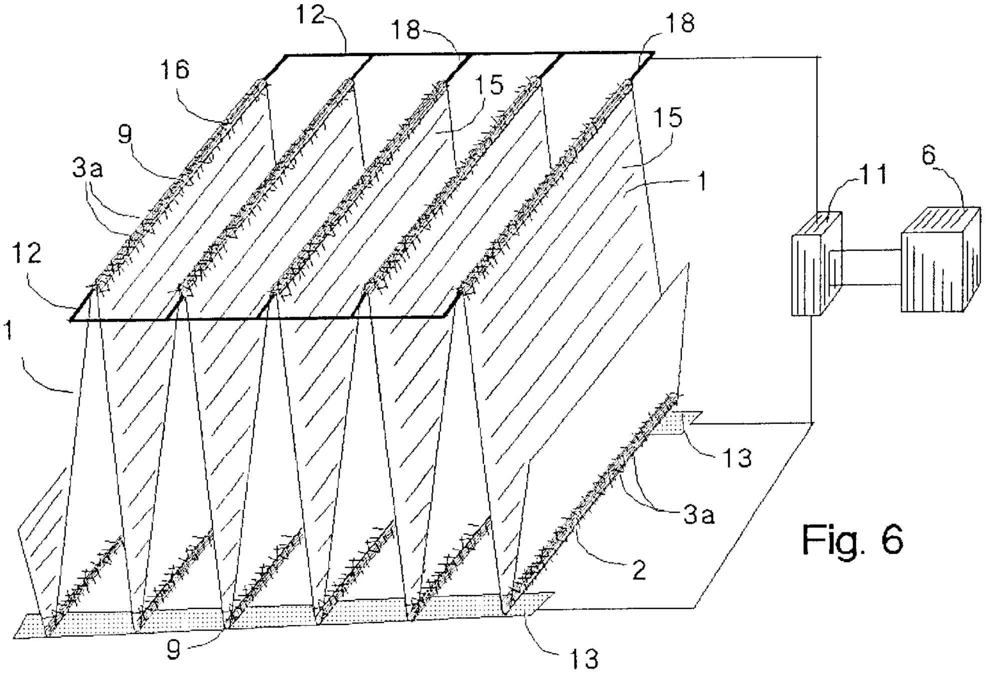
FIG. 6 shows a practical arrangement for the filter which allows easy removal and replacement of the filter medium, provides means for connecting to the high voltage power supply and keeps the pleats of the medium separated.

FIG. 6 shows a practical arrangement for suspending the pleated medium in a holder 12. Holder 12 is a conducting grid which is insulated from the outside frame of the filter. (The frame is not shown for the sake of clarity). The pleated medium of FIG. 3 with conducting folded edges 9 is installed over the grid such that each pleat 15 fits around each rail 18 of the grid with the folded edges 9 of the pleats coming into contact with the rails 18 of the grid. The conductive deposits 16 which penetrate through the fibrous material of the medium, also come in contact with the grid rails 18. The rails 18 serve as the means of supplying voltage from one side of power supply 6 to all individual upstream edges 9 of the filter medium.

On the down-stream side of the filter medium, conducting strips 13 are placed in contact with all of the down-stream edges 9 of the medium. Such strips 13, which may be made of flexible conductive rubber or the like, serve as the means of supplying voltage from the other side of power supply 6 to the ion-inducing conductive array constituted by the conductive down-stream folded edges 9 of the filter 1.

The arrangement of FIG. 6 allows the filter medium to be removed and installed easily from one side of the assembly, it provides electrical contact to the folded edges 9 of the medium and, at the same time, keeps the pleats 15 separated. In lieu of the down-stream coating of the edges 9 of the filter medium, a screen similar to screen 5 in FIGS. 1, 3 and 5 could be used to serve as the ion-inducing counter-electrode.

Pleated filters with string 2 or intended to have a conductive treatment provided along the folded edges 9, can conveniently be constructed in a cartridge format for insertion into a filter assembly in the following manner. The conductive treatment may be readily applied to a pre-folded and assembled filter 1 by immersion of the folded edges 9 of a filter 1 in a shallow bath of conductive-deposit carrying solution. This solution may carry the conductive deposit material 16 eg. carbon, in a solution or as a suspension. Only the edges 9 need be immersed. After immersion the solvent or suspension carrier may be allowed to evaporate, leaving the conductive deposit 16 in place.

By providing ionization along the upstream pleated edges 9 of the pleated filter 1, the filter's efficiency is greatly enhanced as it is evidenced by test results. Test made on an 18"×24"×6" pleated filter as depicted in FIG. 3 without any electronic enhancement show an efficiency of 17.60%. With −20 KV applied to the edges 9 of a filter as in FIG. 1, the efficiency was 75.74%. All measurements were made at the 0.3 micron dust level.

The efficiency of the present invention was further enhanced by using supplemental upstream ionization by employing an ion-source probe as depicted in my U.S. Pat. No. 5,518,531. The efficiency then measured was 96.20%.

Table 1 show three sets of test results for a configuration as in FIG. 3. The first test shows particle count on the upstream and downstream sides of uncharged pleated fibrous media 1, together with trapping efficiencies for dust particles of respectively 0.3; 0.5 and 1.0 microns diameters.

The second measurement shows similar efficiencies for the configuration as in FIG. 3 with a negative potential of 20 kilovolts applied to the upstream contact electrode 4 and the screen 10 grounded.

The third measurement shows efficiencies as in the second measurement, but with the addition of a supplementary negative ion source positioned in the air flow upstream from the filter.

The present invention requires very little maintenance, such as only changing the filter media occasionally, depending on the amount of dust present. The invention also produces an insignificant amount of ozone. This is because only the exposed fine end tips of the fibers in the string, mesh or filter media produce corona. The amount of corona produced is therefore much smaller than that produced from the total surface of the ionizing wires of a precipitator. Furthermore, there are no grounded plates near the strings to increase the corona effect.

TABLE 1

TESTS ON THE PROTOTYPE SELF-IONIZING FILTER, Feb. 25, 2001

| | 0.3 microns | % Eff | 0.5 microns | % Eff | 1 micron | % Eff |
|---|---|---|---|---|---|---|
| Test with No Voltage | | | | | | |
| u/s | 8352 | | 762 | | 97 | |
| d/s | 7194 | 16.10 | 626 | 23.43 | 43 | 58.45 |
| u/s | 8798 | 17.85 | 873 | 23.25 | 110 | 55.00 |
| d/s | 7261 | 18.59 | 714 | 20.09 | 56 | 50.00 |
| u/s | 9041 | 17.58 | 914 | 23.14 | 114 | 51.32 |
| d/s | 7642 | 17.58 | 691 | 28.28 | 55 | 61.67 |
| u/s | 9563 | | 1013 | | 173 | |
| | Average | 17.60 | Average | 23.64 | Average | 55.29 |
| Test with −20 KV on filter | | | | | | |
| u/s | 6250 | | 622 | | 80 | |
| d/s | 1394 | 77.30 | 100 | 83.37 | 2 | 97.39 |
| u/s | 6034 | 95.92 | 581 | 82.53 | 73 | 94.52 |
| d/s | 1512 | 76.05 | 103 | 83.36 | 6 | 92.31 |
| u/s | 6593 | 74.69 | 657 | 82.72 | 83 | 92.17 |
| d/s | 1825 | 73.72 | 124 | 82.22 | 7 | 91.41 |
| u/s | 7294 | | 738 | | 80 | |
| | Average | 75.54 | Average | 82.84 | Average | 55.29 |
| Test with −20 KV on Filter and Negative Upstream Ionization | | | | | | |
| u/s | 5512 | | 433 | | 82 | |
| d/s | 196 | 96.61 | 23 | 95.03 | 2 | 97.71 |
| u/s | 6047 | 96.11 | 492 | 96.04 | 93 | 94.09 |
| d/s | 274 | 95.87 | 16 | 96.81 | 9 | 92.17 |
| u/s | 7236 | 96.01 | 510 | 96.37 | 137 | 95.26 |
| d/s | 303 | 96.41 | 21 | 96.53 | 4 | 97.69 |
| u/s | 9628 | | 702 | | 209 | |
| | Average | 96.20 | Average | 96.16 | Average | 95.26 |

u/s = upstream measurement
u/s = downstream measurement

Conclusion

The foregoing has constituted a description of specific embodiments showing how the invention may be applied and put into use. These embodiments are only exemplary. The invention in its broadest, and more specific aspects, is further described and defined in the claims which now follow.

These claims, and the language used therein, are to be understood in terms of the variants of the invention which have been described. They are not to be restricted to such variants, but are to be read as covering the full scope of the invention as is implicit within the invention and the disclosure that has been provided herein.

I claim:

1. An air filtration system for placing in an air stream comprising:

1) a pleated, air permeable filter medium of electrically insulative material having folded edges present along both an up-stream side and a down-stream side of said filter medium with respect to the direction of airflow to be passed therethrough;

2) exposed, conductive, fiber ends located at least along the up-stream side of said filter medium;

3) an ion-inducing conductive array positioned along the downstream side of the filter medium; and 4) coupling means for connecting a high voltage power supply between said fiber ends and conductive array to create an electric field between them, whereby said conductive fiber ends, when provided with an ionizing voltage potential, will emit ions that charge dust particles to increase the trapping efficiency of the air filtration system.

2. An air filtration system as in claim 1 comprising a conductive mesh of filaments mounted adjacent to said upstream folded edges that provides exposed conductive filament ends as the ion emitting fiber ends.

3. An air filtration system as in claim 1 comprising conductive string containing filaments with filament ends mounted along the folded upstream edges of the filter medium to provide exposed, conductive filament ends as the ion emitting fiber ends.

4. An air filtration system as in claim 1 wherein the pleated medium is fibrous and contains said exposed fiber ends and the folded upstream edges of the pleated medium contain a conductive deposit that renders said upstream edges conductive and said exposed conductive fiber ends ion-emitting.

5. An air filtration device as in claim 4 wherein the folded upstream edges of the pleated medium have been rendered conductive by applying a solution of conductive carbon to such edges to provide carbon as said conductive deposit.

6. An air filtration device as in claim 1, 2, 3, 4, or 5 wherein said ion-inducing conductive array is provided by conductive string present along the folded downstream edges of the pleated medium.

7. An air filtration device as in claim 1, 2, 3, 4, or 5 wherein said ion-inducing conductive array is provided by the folded downstream edges of the pleated medium containing a conductive deposit that renders said downstream edges conductive.

8. An air filtration device as in claim 7 wherein the folded downstream edges of the pleated medium have been rendered conductive by applying a solution of conductive carbon to such edges to provide carbon as said conductive deposit.

9. A pleated, air permeable filter of electrically insulative material having folded edges present along both an up-stream side and a down-stream side of said filter with respect to the direction of airflow to be passed therethrough, said filter comprising a conductive mesh of filaments mounted adjacent to said upstream folded edges that provides exposed conductive filament ends to serve as ion emitting fiber ends.

10. A pleated, air permeable filter of electrically insulative material having folded edges present along both an up-stream side and a down-stream side of said filter with respect to the direction of airflow to be passed therethrough, said filter comprising conductive string containing filaments that provide exposed, conductive filament ends mounted along said upstream folded edges to provide ion-emitting fiber ends.

11. A pleated, air permeable filter of electrically insulative material having folded edges present along both an up-stream side and a down-stream side of said filter with respect to the direction of airflow to be passed therethrough, wherein the filter comprises a pleated filtration medium which is fibrous and contains fiber ends and the folded upstream edges of the pleated filtration medium contains a conductive deposit that renders said upstream edges and fiber ends conductive to serve as ion-emitting fiber ends.

12. An air filter device as in claim 11 wherein the folded upstream edges of the pleated medium have been rendered conductive by applying a solution of conductive carbon to such edges to provide carbon as said conductive deposit.

13. An air filter device as in claim 9, 10, 11, or 12 wherein the downstream folded edges of the pleated medium contain a conductive deposit that renders said downstream folded edges conductive to provide an ion-inducing conductive array.

14. An air filtration device as in claim 13 wherein the downstream folded edges of the pleated medium have been rendered conductive by applying a liquid solution or suspension of conductive carbon to such edges to provide carbon as said conductive deposit.

15. A method of producing a pleated air filter comprising 1) folding an air permeable trapping medium of electrically insulative, fibrous, material that contains fiber ends into a pleated format having folded edges present along both an up-stream side and a down-stream side of said filter with respect to the direction of airflow to be passed therethrough,
2) placing the folded upstream edges of the pleated medium into a liquid that contains a conductive deposit material that renders said upstream edges and fiber ends conductive and
3) removing said liquid to leave the conductive deposit material present along said folded edges to provide a conductive path to said fiber ends enabling them to emit ions when charged to an ionizing potential.

16. An air filtration assembly for placing in an air stream comprising:

1) a pleated, air permeable, filter medium of electrically insulative material having folds in the form of folded edges present along both an up-stream side and a down-stream side of said filter medium with respect to the direction of airflow to be passed therethrough;
2) exposed, conductive fiber ends located along the up-stream folded edges of said filter medium;
3) an ion-inducing conductive array positioned along the downstream side of the filter medium;
4) coupling means for connecting a high voltage power supply between said fiber ends and conductive array to create an ion-inducing electric field between them, and
5) a set of conductive rails wherein said pleated air permeable filter medium is supported by said rails, each rail lying within one of the up-stream folds in the medium and wherein said set of rails is part of the coupling means for applying an ionizing voltage to the fiber ends in the said up-stream folds of said medium and wherein said conductive rails provide separation between said folds.

* * * * *